United States Patent
Tanaka et al.

(10) Patent No.: US 7,335,390 B2
(45) Date of Patent: *Feb. 26, 2008

(54) COMPOSITION CONTAINING SOYBEAN FLAKES AND POTATO FLAKES, METHOD FOR MAKING A FOOD PRODUCT THEREFROM, AND SAID FOOD PRODUCT

(75) Inventors: Itaru "Terry" Tanaka, West Des Moines, IA (US); Safir Moizuddin, Ames, IA (US); Bruce H. T. Liu, Hayward, CA (US)

(73) Assignee: MicroSoy Corporation, Jefferson, IA (US)

( * ) Notice: Subject to any disclaimer, the term of this patent is extended or adjusted under 35 U.S.C. 154(b) by 716 days.

This patent is subject to a terminal disclaimer.

(21) Appl. No.: 10/382,697

(22) Filed: Mar. 6, 2003

(65) Prior Publication Data

US 2004/0175486 A1    Sep. 9, 2004

(51) Int. Cl.
*A23L 1/20*     (2006.01)
*A23L 1/2165*   (2006.01)

(52) U.S. Cl. ...................... 426/634; 426/637

(58) Field of Classification Search ........... 426/634, 426/637
See application file for complete search history.

(56) References Cited

U.S. PATENT DOCUMENTS

| | | | |
|---|---|---|---|
| 3,336,138 A | * | 8/1967 | Nakel .......................... 426/537 |
| 3,911,142 A | | 10/1975 | Huelskamp |
| 3,950,550 A | | 4/1976 | Katayama |
| 4,005,139 A | | 1/1977 | Kortschot |
| 4,103,034 A | * | 7/1978 | Ronai et al. ................. 426/250 |
| 4,895,730 A | | 1/1990 | Chikarashi |
| 5,866,192 A | | 2/1999 | Uesugi |
| 5,899,339 A | | 5/1999 | Noda |
| 5,918,747 A | | 7/1999 | Noda |
| 6,066,353 A | | 5/2000 | Martines-Serna Villagran |
| 6,177,116 B1 | | 1/2001 | Villagran |
| 6,235,333 B1 | | 5/2001 | Martines-Serna Villagran |
| 6,287,622 B1 | | 9/2001 | Martinez-Serna Villagran |
| 6,291,009 B1 | | 9/2001 | Cohen |
| 6,426,111 B1 | | 7/2002 | Hirsch |
| 6,479,089 B2 | | 11/2002 | Cohen |
| 6,495,140 B1 | | 12/2002 | Collins |

FOREIGN PATENT DOCUMENTS

JP     07-227239     8/1995

* cited by examiner

*Primary Examiner*—Arthur L. Corbin
(74) *Attorney, Agent, or Firm*—Sturm & Fix LLP

(57) ABSTRACT

The invention relates to a composition comprising a mixture of full fat, enzyme active, dehulled soybean flakes and potato flakes, for making a soy protein enriched and soy oil containing mashed potato product having excellent nutritional, taste and texture properties. Additionally, the invention relates to method for making said soy protein enriched and soy oil containing mashed potato product from said composition; and to said soy protein enriched and soy oil containing mashed potato product.

12 Claims, No Drawings

COMPOSITION CONTAINING SOYBEAN FLAKES AND POTATO FLAKES, METHOD FOR MAKING A FOOD PRODUCT THEREFROM, AND SAID FOOD PRODUCT

BACKGROUND OF THE INVENTION

1. Field of the Invention

This invention relates to a composition comprising a mixture of full fat, enzyme active, dehulled soybean flakes and potato flakes, for making a soy protein enriched and soy oil containing mashed potato product exhibiting excellent nutritional, taste and texture properties. Also, to method for making said mashed potato product from said composition; and to said mashed potato product per se.

2. Background and Description of Related Art

Soybeans have long been a staple of the Asian diet in multiple food forms including tofu and soymilk, among many other soy based and fermented foods. Soybeans are excellent sources of protein. Enzyme active soy protein, i.e., soy protein which has not been denatured, has a desirable amino acid profile for nutritional purposes, and includes other health promoting elements such as phytoestrogens. In recent years, demand for soy foods has grown dramatically in the United States and other western countries, principally in the form of meat analogues, nutrition bars and powdered nutrition beverages prepared from soy protein isolates and concentrates. Chemically fractionated soy ingredients and soymilk are prepared by modernized methods to reduce much of the traditional "beany" flavor favored in the East, but severely objected to in the West. Demand for natural and organic foods has grown at an extraordinary rate. Foods designated "natural" and/or "organic" generally cannot utilize chemically processed materials. The soy ingredients commonly used today are not full fat or oil, having been treated with solvents such as hexane to remove fats or oils. The terms fats and oils are used interchangeably with respect to soybeans in the prior art and in this application. The defatted concentrates or isolates do not qualify as natural or organic, as has been increasingly popular in today's market. U.S. Pat. Nos. 6,495,140 and 6,426,111, for example, illustrate preparation of soy fractionates and/or isolates using solvent extraction. The soybean flakes used in the present invention are made from full fat, enzyme active, dehulled soybeans, such as by the method recited in U.S. Pat. No. 4,895,730. The soybean flakes used in the present invention qualify as "natural"; and when prepared from soybeans qualifying as organically grown, also qualify as organic foodstuffs.

Full fat, enzyme active (i.e., wherein the proteins are undenatured), dehulled soybeans are excellent sources of elements necessary for good health, and supply outstanding nutritional and nutraceutical benefits. Undenatured soybeans and soybean flakes are excellent sources of protein, iron, vitamin-B, calcium, lecithin and isoflavones. In particular, the lecithin content is from about 2.7 to 3.1 percent. Soybeans also contain essential minerals including phosphorus, which is an essential element used by the body for building bones. Soy isoflavones are now considered helpful in reducing risks for cancer, heart disease, and osteoporosis. Pure soya contains about 38-42%, 18-22% fat or oil (of this lecithin is 2.7-3.1%), 25-35% carbohydrate, 1.5-2.5% minerals, 3-5% fiber, and 5-6% water. Full soya flour furnishes about 89 grams of protein per 1000 calories, i.e., about 132 grams of protein and 44 grams oil per 1000 grams. By contrast potatoes contain only about 21 grams of protein per 1,000 calories. In addition, since soybeans do not contain particular glutens, products containing substantial amount of soybeans offer an alternative for people suffering from celiac disease and/or gluten allergies. Full soya flour contains about three times the grams of protein per 1000 grams as lean beef. A "typical analysis of soy flour and grits appears in "*The Soybean Digest*", Vol. 19, No. 8, June 1959, pages 8 to 9, as follows:

|  | Full fat | High fat | Low fat | Defatted |
|---|---|---|---|---|
| Protein, % | 40.0 | 45.0 | 48.0 | 52.0 |
| Fat, % | 20.0 | 15.0 | 5.0 | 0.5 |
| Fiber, % | 2.5 | 2.5 | 3.0 | 3.0 |
| Ash, % | 5.0 | 5.0 | 5.5 | 6.5 |
| Moisture, % | 8.0 | 8.0 | 8.0 | 8.0 |

MicroSoy full fat, enzyme active soybean flakes contain 40.48% protein, 19.0% fat, 2.1% fiber, 4.79% ash, 8.08% moisture and 27.59% carbohydrate.

There exists in the prior art need for soy protein enriched products, while maintaining good taste, texture, and processibility in standard food processing equipment. Applicants and the prior art face the problem that unfortunately products containing large amounts of soybeans tend to exhibit undesirable taste and/or texture properties. For Example, products containing large amounts of soy materials, may exhibit unpleasant characteristics including chalkiness and/or mouth dryness, grittiness, grassy flavor, bitter flavor, salty flavor, and astringency. Moreover, applicants and the prior art face the problem that soybeans do not contain certain proteins, such as the prolamins, gliadin or glutenin, nor sufficient starches, that provide elasticity, cohesiveness and binding during processing.

An average serving of potato (one medium potato or about 148 grams) contains only 3 grams of protein. There is a need for a mashed potato product having significantly increased protein content, without negatively affecting the consumer acceptance thereof, and to make the health claim of providing a minimum of 6.25 grams of soy protein per serving. Additionally, potato products, such as mashed potatoes containing 100% potatoes, are known in the art to exhibit a bland starchy taste and pasty feel. This is due in part to the fact that potatoes contain large amounts of starch, and little or no fat or oil. Moreover, potato is in the nightshade family and suspect in certain arthritic maladies. Applicants' inventive product contains a smaller percentage potato that ordinary mashed potato.

Applicants have discovered that unexpectedly full fat, enzyme active soybean flakes made from mechanically dehulled soybeans, when mixed with potato flakes, provide a composition that avoids the problems faced by the prior art of undesirable taste and texture properties. Applicants' composition and method unexpectedly results in a soy protein enriched, soy oil containing mashed potato product, which exhibits excellent nutritional, taste and texture properties.

Addition of small amounts of soya flour to mashed potatoes has been mentioned as early as 1941 (*The Soybean Digest*, Vol. 2, No. 9, December 1941, pages 2 to 5). U.S. Pat. No. 4,005,139 illustrates dehydrated potato solids in the form of flakes, granules and/or powder, and containing various additives, binders, fillers, gums, and texturizing agents, in which the potato portion constitutes at least 50% of the mixture. The dehydrated potato solids are disclosed to be formed into slurry or dough, and used subsequently for preparing products suitable for deep frying. U.S. Pat. No. 6,066,353 illustrates dehydrated potato flakes prepared from potato slices, slivers and/or nubbins, which flakes are used to prepare more cohesive, non-sticking, machinable dough compositions. U.S. Pat. No. 6,235,333 illustrates a sheetable dough composition useful for making fried snack pieces. The sheetable dough composition is disclosed to comprise about 50% to about 70% of a starch-based material, wherein said starch-based material comprises from about 25% to about 100% dehydrated potato flakes.

U.S. Pat. No. 6,235,333 further indicates that the starch-based material may contain other ingredients including potato flour, tapioca flour, peanut flour, wheat flower, oat flour, rice flour, corn flour, soy meal, corn meal, potato starch, tapioca starch, corn starch, oat starch, cassaya starch and mixtures thereof. U.S. Pat. No. 6,287,622 similarly discloses 30-60% "other starch" such as soy meal.

U.S. Pat. No. 3,911,142 illustrates a ready-to-eat snack type wafer made by dry mixing potato flakes and various ingredients including soy protein, blending with water, followed by sheeting or extruding, and then baking or frying. U.S. Pat. No. 3,950,550 shows making a fried tofu product by forming a kneaded soy dough, which may contain potato starch, into a desired shape, and deep frying the shaped material in two successive stages. U.S. Pat. No. 6,479,089 illustrates a cohesive soy based machinable dough comprising soy grits and potato starch as one of the additional ingredients.

U.S. Pat. No. 6,177,116 discloses a dough composition useful for preparing fried chips, which composition is a starched-based material comprising from about 40% to about 90% combined potato flakes and granules, and from about 10% to about 60% of other starch containing ingredients selected from potato flour, tapioca flour, peanut flour, wheat flour, oat flour, rice flour, corn flour, soy meal, corn meal, potato starch, tapioca starch, cornstarch, oat starch, cassaya starch, and mixtures thereof.

U.S. Pat. No. 6,291,009 teaches making chips or crackers using soy flour and potato flour. U.S. Pat. No. 5,866,192 discloses preparation of an edible material containing soybean walls purported to have a good taste and mouthfeel, and useful similarly to soybean jam or mashed potato.

Japanese patent document #53-133657, dated Nov. 28, 1978, illustrates a method comprising kneading with water a dry potato powder mixture, containing added gluten powder, optionally together with 1% or more soybean protein powder, dry egg white powder, polysaccharide and starch; followed by molding the obtained dough into suitable form, and frying it in suitable oil.

Japanese patent document 44-11594 (1969) illustrates a method of producing soybean paste powder that can be suitably crushed and treated, characterized by adding 3% to 25% steamed potato or dried mashed potato flake to uncooked soybean paste and drying using a single drum dryer.

Japanese patent publication #07-227239, published Aug. 29, 1995, shows imitation potato made by gelling a mixture of potato flakes and vegetable fibers (e.g., the vegetable fibers of soybean flour), to which a gelling agent has been added.

SUMMARY OF THE INVENTION

It is an object of applicants' invention to provide a composition containing potato flakes and full fat, enzyme active, dehulled soybean flakes useful for preparing a soy protein enriched and soy oil containing mashed potato product having enhanced protein content and nutritional benefits, and unexpectedly exhibiting excellent flavor and texture characteristics, describable as a creamy but thick consistency. It is also an object to provide method for preparing a soy protein enriched and soy oil containing mashed potato product from the inventive composition. An additional object of the invention is the soy protein enriched and soy oil containing mashed potato product itself, which exhibits excellent flavor and texture characteristics, described as a creamy but thick consistency.

Applicants have discovered that, surprisingly, compositions containing potato flakes and full fat, enzyme active, dehulled soybean flakes in amounts between 1 and 45%, preferably between 20 and 45%, and most preferably between 25 and 45%, are useful in making novel and unobvious protein enriched, soy oil containing mashed potato products having enhanced nutritional properties, including protein content; and exhibiting excellent flavor and texture characteristics, describable as a creamy but thick consistency. Applicants' have also discovered method for preparing the soy protein enriched and soy oil containing mashed potato products from the potato flake and soy flake containing compositions. Applicants have additionally discovered said soy protein enriched and soy oil containing mashed potato product per se. Soybean flakes contain less starch than potato, and beneficially provide substantial amounts of protein and flavor contributing oil to the inventive composition and product. An outstanding feature of the applicants' soybean containing mashed potato product is the relatively high content of balanced proteins, containing in readily available form all of the so-called essential amino acids in proportions that insure or promote efficient utilization within the body.

Unlike the cited prior art, which tend to use hulled (hull not removed), de-fatted soy materials, concentrates or isolates, applicants' invention utilizes full fat, enzyme active, dehulled soybean flakes. The dehulled, full fat, enzyme active soybean flakes used in applicants' invention provide significant advantages over soybean materials that have been processed by grinding or extruding to form granules and particularly powders. The forming into small granules and especially powders dramatically increases the surface area of the soybean material exposed to oxygen and moisture, and adversely subjects the soybean material to denaturing heat and exposure to oxygen and moisture during processing. The exposure and additional heating lead to degradation of the soybean material, especially denaturing of the proteins, and off-flavors.

The full fat, enzyme active, dehulled soybean flakes useful in applicants' invention can be prepared in accordance with U.S. Pat. No. 4,895,730, which patent is incorporated herein by reference. As disclosed in this patent, the soybean flakes are prepared by (1) brushing the soybeans to remove earth matter and earth born germs; (2) adjusting the water content to facilitate separation of the skin portion; (3) separating the skin portion from the flesh portion, while simultaneously dividing the flesh portion of each soybean into four to eight parts; and, (4) passing the soybean granules thus obtained through flat-pressing rollers, whereby a product in the form of a mass of uniformly distributed, dehulled, full fat, enzyme active soybean flakes is obtained. The soybean flakes have a thickness of about 0.2 mm., or less, and long storage capability. The heat resistant earth-born germs and sporal germs are completely removed during the brushing and dehulling or skinning of the soybeans, which germs are not removed by the conventional step of washing. The resulting soybean flakes and foodstuffs prepared therefrom are thus rendered less perishable and highly wholesome. Soybean flakes prepared according to U.S. Pat. No. 4,895,730 are especially useful in the present invention. While a numerous varieties of soybeans are available, the hilum varieties are preferred; and, especially at higher soybean flake concentrations, the null and especially triple null soybeans are especially useful. The triple null soybeans are essentially free of the native lipoxygenase enzyme that causes an unpleasant and generally undesired flavor in soy foods.

Applicants have discovered that soybean flakes blend unexpectedly well with potato flakes. This is especially true of soybean flakes prepared according to U.S. Pat. No. 4,895,730. This is due in part to the similar shape, texture and relatively close densities of soybean flakes and potato flakes. The specific gravity of potato flakes is around 0.3 and the specific gravity of MicroSoy flakes is around 0.5.

DETAILED DESCRIPTION OF THE INVENTION

Applicants have invented a composition comprising potato flakes and from 1-45% full fat, enzyme active soybean flakes, preferably from 20-45% full fat, and most preferably from 25 to 45%. Various of the commercially available dehydrated potato flakes are suitable for use in the present invention. Applicants have also invented method for making a soybean protein enriched and soy oil containing mashed potato product from the inventive potato flake and soybean flake containing composition. The novel and unobvious soybean protein enriched and soy oil containing mashed potato product also constitutes a part of applicants' invention.

Potato Flakes

Potato flakes useful in the present invention are generally commercially available. Such potato flakes are typified, for example, by those available from RDO Foods Company in Grand Forks, N.Dak. The RDO Foods Company dehydrated mashed potato flakes contains 0.3% to 0.6% mono- & diglycerides, 0 to 1000 ppm added sodium acid phosphate, 50 to 100 ppm added citric acid, and 3% reducing sugars.

Soybean Flakes

The full fat, enzyme active soybean flakes used in the present invention are made from full fat, enzyme active (undenatured), dehulled soybeans. Many suitable varieties of soybeans are available. However, hilum soybeans are preferred for making the soybean flakes used in the present invention. The yellow or clear hilum soybeans are especially preferred. Use of black hilum soybeans is less desirable due to the carry over of color into the inventive composition and inventive product, which some find less aesthetic or appetizing. In a more preferred embodiment, the soybeans used are single, double or triple null variety; most preferably triple-null soybeans. Null refers to soybeans wherein the lipoxygenase enzymes has been bred out of the soybean. Triple-null refers to soybeans which are essentially free of lipoxygenase enzymes.

While the soybean flakes may be made by a variety of processes known in the prior art, it is advantageous that the soybeans be mechanically dehulled and processed. The temperature of the soybeans material during processing to flakes should be maintained no higher than 55° C., and more preferably no higher than 50° C. Higher temperatures lead to denaturing of the soybean material, and off flavors. Especially preferred soybean flakes for use in the present invention are those made by the method disclosed in U.S. Pat. No. 4,895,730, which patent is incorporated herein by reference. As disclosed in this patent, full fat, enzyme active soybean flakes are prepared by subjecting soybeans to brushing and dehulling or skinning, such that earth-born germs and sporal germs are completely removed, including those which are heat resistant and those which cannot be removed by the conventional step of washing the material soybean in water. The flakes and food stuffs made therefrom are rendered less perishable and highly wholesome. The processing of the soybeans in the patent includes, after the brushing step, a step of adjusting the Water content of the soybeans to facilitate separation of the skin portion of the soybean from the flesh portion thereof. The soybean is then separated into skin portion and flesh portion, and simultaneously the flesh portion of each piece of soybean is divided into four to eight parts. The soybean granules thus obtained are passed through flat-pressing rollers, whereby a product in the form of a mass of uniformly distributed flakes results. The adjustment of water content of the soybean facilitates skin/flesh separation and also dries the flesh, so that a product having a low moisture content and good storage stability can be obtained when the flesh is reduced to flakes. Said water content adjustment is carried out such that the temperature of the soybean material does not exceed temperatures which will not cause thermal denaturing of the soy protein. The temperature of the soybean material does not exceed 55° C.; and more preferably 50° C. "Full fat" refers to soybean flakes where no fat has been removed, except that very small amount lost during washing and dehulling. Such soybean flakes are commonly referred to and known as "full fat" or "full oil". The preferred full fat, enzyme active soybean flakes made from dehulled soybeans are currently available from MicroSoy Corporation in Jefferson, Iowa, marketed under the trademark MicroSoy Flakes. These full fat, enzyme active MicroSoy Flakes are mechanically dehulled and made substantially according to the method set forth in U.S. Pat. No. 4,895,730. The soybean flakes most useful in the present invention at higher soybean flake concentrations are made from null variety soybeans, and especially the triple null variety soybeans.

Applicants have also discovered that the use of soybean flakes provide a unexpected difference in the flavor and texture perception of the mashed potato product made therefrom, as compared with the use of soy granules or powder. During preparation of soybean granules and especially powder, the surface area of the soybean material is increased, with consequent increased degradative exposure to oxygen, moisture, and additional heating during grinding. The inventive composition is prepared by mixing the full fat, enzyme active, dehulled soybean flakes with the potato flakes. Applicants have discovered the unexpected benefit that the soybean flakes and potato flakes mix and remain mixed exceptionally well, and do not tend to separate in handling and storage, as opposed to soybean granules or powder. This is due at least in part to the discovery that the soybean flakes and the potato flakes are relatively close in texture, size and specific gravities. Moreover, the dehulled, full fat, enzyme active flakes favored for use in the present invention qualify as natural, and are free from "harmful" additives. When soybeans and potatoes qualifying as organic are used, the inventive composition and inventive product would qualify as organic.

Additional optional ingredients may be added to the inventive composition, during the inventive method, and/or to the inventive product, such as dairy or soy milk (whole, powdered, or concentrated), butter, butter substitutes, and/or various spices. The presence of the soy protein and soy oil in the inventive mashed potato product unexpectedly provides, in addition to the health benefits thereof, an enhancement of perceived taste and texture, describable as thick and creamy. The inventive mashed potato product contains an enhanced amount of beneficial protein and oil from the soy flakes, and a lesser amount of potato starch per serving.

Soybean flakes are present in the inventive composition in amounts from 1 to 45% by weight full fat, enzyme active soybean flakes prepared from mechanically dehulled soybeans. Where the soybean flakes are made from null variety soybeans, amount from 20 to 45%, and especially 25 to 45% by weight, are beneficial. Applicants' most preferred composition contains 25 to 45% full fat, enzyme active soybean flakes prepared from mechanically dehulled and processed full fat, enzyme active triple-nullvariety soy beans. In a highly preferred embodiment, the soybean flakes are those made substantially by the method set forth in U.S. Pat. No. 4,895,730, which are commercially marketed by MicroSoy Corporation, under the brand name MicroSoy Flakes. MicroSoy Corporation has a main office and plant in Jefferson, Iowa. MicroSoy Flakes are full fat, enzyme active, made from mechanically dehulled and processed soybeans. Preferred soybeans for preparing the soybean flakes used in the present invention are clear or yellow hilum soybeans. Null variety soybeans, and especially triple null soybeans, are highly preferred, especially for the higher ranges of soybean flake content of the inventive composition.

A further aspect of the present invention includes the method for preparing the inventive soybean protein enriched and soy oil containing mashed potato product from the inventive soy flake and potato flake composition. The soybean protein enriched and soy oil containing mashed potato product is made by adding the inventive composition to at or near boiling water, while continuously stirring. Adding, as soon as no dry flakes remain visible, adding dairy or soy milk (or other milk substitute) to the mix, while continuing to stir, until all the liquids are absorbed. Other ingredients may, of course, be added as desired to provide additional flavor or texture, such as salt, other seasonings, butter, butter substitutes, etc.

A preferred method of preparing the inventive soy protein enriched and soy oil containing mashed potato product, having excellent taste and texture, describable as a creamy but thick consistency, is as follows:

A. Heating water to at or near boiling;
B. Optionally adding salt to the water;
C. Stopping heating the water, and immediately adding the inventive soy flakepotato flake composition to the heated water, while continuously stirring;
D. As soon as no dry flakes remain visible, adding dairy milk or soymilk, while continuing to stir until all liquids are absorbed into the mixture; and,
E. Optionally adding butter or butter substitute with the milk or after all liquids are absorbed.

As an illustrative example, the following amounts were used in preparing the soybean containing mashed potato:
Mixture (MicroSoy Flakes+Potato Flakes)=117 grams
Salt=2.9 grams (optional)
Water=9 ounces to 17 ounces
2% Milk=7 ounces
Butter=optional An alternate method using microwave heating in preparing the inventive soy protein enriched and soy oil containing mashed potato product includes the following steps:

A. Mixing water, soymilk and/or dairy milk and salt in a microwave-safe container;
B. Loosely covering the container so steam can escape and microwaving for two minutes on high or until the mixture just starts to boil;
C. Immediately adding the heated water/milk solution to a bowl containing the inventive composition of soybean flakes and potato flakes;
D. Mixing and whipping vigorously; and,
E. Optionally adding more water, soymilk and/or dairy milk for a creamier texture;

As an illustrative example, the following amounts were used in the alternate method:
MicroSoy Flakes+Potato Flakes=58.5 grams
Salt=1.0 grams (optional)
Water=100 grams
Soymilk or Dairy Milk=41 grams
Butter=1 tablespoon (optional)

A further aspect of the present invention includes the soy-containing mashed potato product prepared from the potato and soy flake composition of this invention. A most preferred inventive soy protein enriched and soy oil containing mashed potato product is that made by the above recited preferred method using MicroSoy flakes made from full fat, enzyme active triple null soybean flakes.

COMPARATIVE TESTS AND EXAMPLES

An evaluation, using a panel of 36 members, was conducted to determine the concentrations of soybean flakes (MicroSoy Flakes) at which the flavor and texture of the cooked mashed potato product became unacceptable; and to determine if the use of specialty MicroSoy Flakes made from lipoxygenase null soybeans, would allow higher concentrations of soybean flakes in the inventive composition. The panelists were asked to evaluate six characteristics of the mashed potato products, i.e., grittiness, potato flavor, grassy flavor, bitter flavor, saltiness, and astringency or mouth-dryness. Five samples were presented containing the following concentrations of MicroSoy Flakes per sample: Control (0%), Regular 1 (20%), Regular 2 (25%), Null 1 (20%), and Null 2 (25%). The "Regular" samples were prepared from flakes made using IA3011 variety soybeans, and the "Null" samples were prepared using flakes made using IA2025 variety soybeans. The Control contained no soybean flakes. It was concluded from these tests that soybean variety made a difference in flavor perception of the soybean flake fortified mashed potato product. MicroSoy flake addition in lower concentrations was surprisingly and unexpectedly found to enhance the potato flavor in the soybean flake fortified mashed potato product.

MicroSoy Flakes having no additives, and dehydrated mashed potato flakes, obtained from RDO Foods Company in Grand Forks, N.Dak., were used in making the samples tested in the evaluation. The mashed potato flakes analyzed as follows:

a. BHA=0%
b. Mono & Diglycerides=0.3 to 0.6%
c. Sodium Acid Phosphate=0 to 1000 ppm (added)
d. Citric Acid=50 to 100 ppm (added)
e. Reducing Sugars=3%

The ratio of ingredients used in the test examples were as follows:
Inventive Composition (MicroSoy Flakes+Potato flakes)=117 g.
Salt=2.0 g. (optional)
Water=9 to 17 oz. (266.157 to 443.595 ml.)
2% Milk=7 oz. (207.011 ml.)

The test samples were prepared according to the preferred method of the invention set forth earlier herein. The five test samples are compared in each of the six comparative test examples.

The tests set forth in the examples used the statistical analysis system seven (SAS) and a general linear regression procedure (GLM). The test controls the Type I comparison-wise error rate, not the experimental error rate; i.e. compares the error rate on the experimental data, not on the experimental method per se. The number "trt" is a arbitrary number assigned to the samples tested to avoid and minimize any bias in the panel to consecutive sample numbers. Such bias might occur if samples were numbered consecutively as 1, 2, 3, 4, 5, 6, 7, etc. The panelists rated the samples on a scale of 1 to 150. The higher the number the stronger the tested characteristic or attribute. The evaluation numbers are expressed as a "mean" thereof. N indicates the number of panelists testing a given sample. Samples having the same "t Grouping" letter (i.e., A, B and/C) do not significantly differ from each other in the looked for characteristic or attribute. For example, in Test Example I for "gritty", the samples for Regular 20%, Null 20% and Null 25% had a "t grouping" of B, indicating they did not significantly differ from each other in the "gritty" attribute. Likewise, Control 0% and Null 20% each had a "t Grouping" of C, indicating they did not significantly differ from each other in the "gritty" attribute. Also, Regular 20%, Regular 25% and Null 25% each received "t Grouping" designations, and thus did not significantly differ from each other in the "gritty" attribute. Alpha represents the level of tolerance for determining which sample test scores or numbers to drop or include in the test results. i.e., how narrow the bell curve within which test scores or numbers must fall to be included in the test results; or, conversely which test scores or numbers fall outside the bell curve and are rejected and not included in the test results.

| COMPARATIVE EXAMPLE 1 FOR "GRITTY": | |
|---|---|
| Alpha | 0.05 |
| Error Degrees of Freedom | 174 |
| Error Mean Square | 1472.237 |
| Critical Value of t | 1.97369 |
| Least Significant Difference | 17.901 |
| Harmonic Mean of Cell Sizes | 35.79545* |

*Cell sizes were not equal

| Sample | Percent | t Grouping | | Mean | N | trt # |
|---|---|---|---|---|---|---|
| Control | 0% | | C | 45.314 | 35 | 389 |
| Regular | 20% | B | A | 72.611 | 36 | 108 |
| Regular | 25% | | A | 79.611 | 36 | 721 |
| Null | 20% | B | C | 59.944 | 36 | 574 |
| Null | 25% | B | A | 69.750 | 36 | 676 |

| COMPARATIVE EXAMPLE 2 FOR "POTATO" FLAVOR: | |
|---|---|
| Alpha | 0.05 |
| Error Degrees of Freedom | 174 |
| Error Mean Square | 1357.553 |
| Critical Value of t | 1.97369 |
| Least Significant Difference | 17.189 |
| Harmonic Mean of Cell Sizes | 35.79545 |

| Sample | Percent | t Grouping | | Mean | N | trt # |
|---|---|---|---|---|---|---|
| Control | 0% | | A | 92.543 | 35 | 389 |
| Regular | 20% | | C | 47.222 | 36 | 108 |
| Regular | 25% | B | C | 63.750 | 36 | 721 |
| Null | 20% | B | A | 77.694 | 36 | 574 |
| Null | 25% | B | | 71.500 | 36 | 676 |

| COMPARATIVE EXAMPLE 3 FOR "GRASSY" FLAVOR: | |
|---|---|
| Alpha | 0.05 |
| Error Degrees of Freedom | 174 |
| Error Mean Square | 1296.31 |
| Critical Value of t | 1.97369 |
| Least Significant Difference | 16.797 |
| Harmonic Mean of Cell Sizes | 35.79545 |

| Sample | Percent | t Grouping | | Mean | N | trt # |
|---|---|---|---|---|---|---|
| Control | 0% | C | | 34.400 | 35 | 389 |
| Regular | 20% | | A | 93.444 | 36 | 108 |
| Regular | 25% | | B | 63.083 | 36 | 721 |
| Null | 20% | C | B | 50.861 | 36 | 574 |
| Null | 25% | | B | 56.694 | 36 | 676 |

| COMPARATIVE EXAMPLE 4 FOR "BITTER" FLAVOR: | |
|---|---|
| Alpha | 0.05 |
| Error Degrees of Freedom | 174 |
| Error Mean Square | 1182.524 |
| Critical Value of t | 1.97369 |
| Least Significant Difference | 16.043 |
| Harmonic Mean of Cell Sizes | 35.79545 |

| Sample | Percent | t Grouping | Mean | N | trt # |
|---|---|---|---|---|---|
| Control | 0% | B | 27.771 | 35 | 389 |
| Regular | 20% | A | 62.167 | 36 | 108 |
| Regular | 25% | B | 39.083 | 36 | 721 |
| Null | 20% | B | 34.194 | 36 | 574 |
| Null | 25% | B | 41.806 | 36 | 676 |

| COMPARATIVE EXAMPLE 5 FOR "ASTRINGENT": | |
|---|---|
| Alpha | 0.05 |
| Error Degrees of Freedom | 174 |
| Error Mean Square | 1899.571 |
| Critical Value of t | 1.97369 |

-continued

COMPARATIVE EXAMPLE 5 FOR "ASTRINGENT":

| | |
|---|---|
| Least Significant Difference | 20.333 |
| Harmonic Mean of Cell Sizes | 35.79545 |

| Sample | Percent | t | Grouping | Mean | N | trt # |
|---|---|---|---|---|---|---|
| Control | 0% | | A | 63.63 | 35 | 389 |
| Regular | 20% | B | | 42.00 | 36 | 108 |
| Regular | 25% | B | A | 60.17 | 36 | 721 |
| Null | 20% | B | A | 46.53 | 36 | 574 |
| Null | 25% | B | A | 51.67 | 36 | 676 |

COMPARATIVE EXAMPLE 6 FOR "SALTY" FLAVOR:

| | |
|---|---|
| Alpha | 0.05 |
| Error Degrees of Freedom | 172 |
| Error Mean Square | 1142.347 |
| Critical Value of t | 1.97385 |
| Least Significant Difference | 15.859 |
| Harmonic Mean of Cell Sizes | 35.39326 |

| Sample | Percent | t | Grouping | Mean | N | trt # |
|---|---|---|---|---|---|---|
| Control | 0% | | A | 38.057 | 35 | 389 |
| Regular | 20% | | A | 47.800 | 35 | 108 |
| Regular | 25% | | A | 49.143 | 35 | 721 |
| Null | 20% | | A | 51.167 | 36 | 574 |
| Null | 25% | | A | 51.972 | 36 | 676 |

Further comparative testing was done using a consumer panel with 44 members, to determine the acceptability the inventive soybean containing mashed potato product, especially at higher soybean concentrations. The panelists were asked to individually evaluate five samples containing the following MicroSoy Flake (MSF) concentrations: No MSF (0%) (#676), 20% Null MSF (#389), 30% Null MSF (#676), 40% Null MSF (#721), and 40% Roasted MSF (#108). Roasted contained flakes contained IA3006 variety MSF, and the Nulls contained IA2025 variety MSF. The higher the number the greater the consumer acceptance level found by the panel. The tabulation of the results of this further comparative testing were as follows:

| Percent MSF | Sample # | Overall Rating | Flavor | Texture | Appearance |
|---|---|---|---|---|---|
| No MSF | 574 | 981 | 983 | 983 | 981 |
| 20% Null MSF | 389 | 979 | 979 | 979 | 979 |
| 30% Null MSF | 676 | 975 | 983 | 984 | 983 |
| 40% Null MSF | 721 | 985 | 982 | 984 | 943 |
| 40% Roasted MSF | 108 | 984 | 984 | 984 | 981 |

Very surprisingly and unexpectedly the consumer acceptance test indicates little or no significant difference in flavor, texture or appearance perception. Although the appearance of Sample #721 (40% Null MSF) was significantly different than all other samples tested. Given the art recognized problems of undesirable flavors and textures resulting from incorporation of soybean materials, especially in amounts as high as tested, applicants have discovered that unexpectedly full fat, enzyme active, dehulled soybean flakes can be substituted in mashed potato flake compositions without detrimentally altering the mashed potato product made therefrom, and surprisingly even enhancing the flavor and texture. It would have been totally unexpected, given the art recognized problems and difficulties with inclusion of soybean materials in various food stuffs, that incorporation of full fat, enzyme active soybean flakes in lower amounts would enhance the texture and flavor of mashed potato products. And, that incorporation in amounts of 20 or 25% and higher soybeans flakes, especially made with Null soybeans, would not adversely affect the texture or flavor of the resulting soybean containing mashed potato product. The panel members who ate potato less than once a month (7 in number) preferred all samples with MSF added over the 0% MSF sample. Panelists who ate potatoes 2-4 times a month (23) found no difference in the samples. However, of these panelists fourteen preferred the texture of the mashed potato with higher concentrations of MSF (30 and 40% MSF) over the no MSF and 20% MSF. Overall the sample with 40% MSF was rated most acceptable.

What is claimed is:

1. A composition for making soy protein enriched and soy oil containing mashed potato product consisting essentially of:
   (i) from 20 to 45% by weight full fat, enzyme active, dehulled soybean flakes; and,
   (ii) from 80 to 55% by weight potato flakes.

2. The composition of claim 1 wherein the soybean flakes are made from full fat, enzyme active, dehulled hilum soybeans.

3. The composition of claim 1 wherein the soybean flakes are made from full fat, enzyme active, dehulled null soybeans.

4. The composition of claim 3 wherein the null soybeans are triple-null.

5. The composition of claim 1 wherein the composition contains about 40% full fat, enzyme active soybean flakes made from full fat, enzyme active, dehulled, triple-null soybeans.

6. The composition of claim 1 wherein the soybean flakes are made from mechanically dehulled and processed soybeans, in which substantially none of the soybean fat/oil is removed.

7. The composition of claim 1 wherein the soybean flakes are prepared according to the method comprising:
   (i) brushing the soybeans:
   (ii) adjusting the water content of the soybeans to facilitate separation of the skin portion of the soybean from the flesh portion thereof;
   (iii) separating the skin portions of the soybeans from the flesh portions;
   (iv) simultaneous with separating dividing each flesh portion into four to eight flesh parts; and,
   (v) passing the flesh parts through flat-pressing rollers, whereby a product in the form of a mass of uniformly distributed flakes results.

8. The composition of claim 1 wherein the composition comprises:
   (i) from 25 to 45% full fat, enzyme active, dehulled soybean flakes; and,
   (ii) from 75 to 55% potato flakes.

9. The composition of claim 8 wherein the soybean flakes are made from full fat, enzyme active, dehulled null soybeans.

10. The composition of claim 8 wherein the soybean flakes are made from full fat, enzyme active, mechanically dehulled and processed null soybeans.

11. The composition of claim 8 wherein the soybeans are triple-null.

12. The composition of claim 8 wherein the soybean flakes are prepared according to the method comprising:
  i) brushing the soybeans;
  ii) adjusting the water content of the soybeans to facilitate separation of the skin portion of the soybean from the flesh portion thereof;
  iii) separating the skin portions of the soybeans from the flesh portions;
  iv) simultaneous with separating dividing each flesh portion into four to eight flesh parts; and,
  v) passing the flesh parts through flat-pressing rollers, whereby a product in the form of a mass of uniformly distributed flakes results.

* * * * *